United States Patent [19]
Williams

[11] Patent Number: 6,105,681
[45] Date of Patent: Aug. 22, 2000

[54] DEVICE FOR LIFTING MATTED GROUNDCOVER

[76] Inventor: R. Judd Williams, 3039 ChattahoocheeTrace, Gainesville, Ga. 30506

[21] Appl. No.: 09/050,532

[22] Filed: Mar. 30, 1998

[51] Int. Cl.[7] ....................................................... A01B 1/18
[52] U.S. Cl. ......................... 172/378; 294/50.6; 294/121; 7/114
[58] Field of Search .................................. 172/371, 372, 172/375, 376, 378; 294/121, 122, 58, 50.6; 7/114–116

[56] References Cited

U.S. PATENT DOCUMENTS

| | | | |
|---|---|---|---|
| 39,128 | 7/1863 | Dick ........................................ 294/121 |
| 71,829 | 12/1867 | Willard ..................................... 294/121 |
| 144,147 | 10/1873 | Schmeltzer et al. ................. 294/121 X |
| 166,152 | 7/1875 | Shellenberger ......................... 294/121 |
| 166,171 | 7/1875 | White .................................... 294/121 X |
| 352,736 | 11/1886 | Coles ..................................... 294/121 X |
| 732,675 | 6/1903 | Cochran ................................. 294/121 X |
| 1,924,002 | 8/1933 | Rush ...................................... 294/50.6 |
| 2,066,598 | 1/1937 | Wiessner ................................ 294/121 X |
| 2,251,587 | 8/1941 | Gagner ................................ 294/50.6 X |
| 2,689,762 | 9/1954 | Krumm ................................... 294/50.6 |
| 2,732,242 | 1/1956 | Belford ................................ 294/122 X |
| 2,860,001 | 11/1958 | Garland ................................. 294/50.6 |
| 3,482,349 | 12/1969 | Spann ................................... 294/121 X |
| 4,983,087 | 1/1991 | Mierek ................................. 294/121 X |
| 5,048,883 | 9/1991 | Waluk ................................... 294/58 X |
| 5,435,396 | 7/1995 | Robichaux ............................ 294/58 X |
| 5,529,357 | 6/1996 | Hoffman ................................... 294/58 |
| 5,625,922 | 5/1997 | Morad ................................... 294/58 X |
| 5,799,996 | 9/1998 | Fredrickson .......................... 294/58 X |

FOREIGN PATENT DOCUMENTS 2248034  3/1992  United Kingdom ..................... 294/58

Primary Examiner—Christopher J. Novosad
Attorney, Agent, or Firm—Technoprop Colton LLC

[57] ABSTRACT

A yard garden tool for heightening matted groundcover, the yard garden tool constructed from a main shaft having an upper end and a lower end and a lifting member attached to the lower end of the main shaft. The lifting member is capable of sliding under a portion of the matted groundcover and remaining in contact with a portion of the groundcover, and wherein upon lifting, the lifting member elevates, or fluffs, the groundcover.

10 Claims, 5 Drawing Sheets

DEVICE FOR LIFTING MATTED GROUNDCOVER

BACKGROUND OF THE INVENTION

1. Field of the Invention

The present invention relates generally to a yard and garden tool. In particular, the invention relates to a manually operated yard and garden tool for lifting and fluffing straw. The invention allows an individual to fluff straw in a landscape bed, for example, a pine straw bed, without excessively bending his/her back.

2. Technical Field of the Invention

The technical field of the invention relates generally to manually operated yard and garden tools.

Many landscaping options are open to both residential and commercial landowners. One popular feature of landscaped grounds is the landscape island. Typically, the landscape island is an area of yard comprising a distinct look apart from the rest of the yard. For example, an island may be an area covered by groundcover, mulch, pine straw, or the like, which creates a visual and textural separation of this area from the yard.

Through various cycles of weather, time, and general exposure, the covering of an island can become matted or compacted. This process can make the landscape island unsightly.

Typically, the landscaper must resort to buying more mulch or pine straw to cover the existing matted groundcover. Not only can this process become rather expensive, but upon delivery of the new groundcover, the landscaper may be left with the backbreaking job of moving, for example, several cubic yards of cover to various islands around the yard.

The present invention increases the height of matted island cover, therefore restoring the beauty of the island.

BRIEF SUMMARY OF THE INVENTION

Briefly described, in preferred form, the present invention comprises a main shaft having an upper and lower end, a handle portion, a lifting member, and a bracing component.

Preferably, the present invention comprises a lightweight, durable yard tool that can easily be moved about the yard to the various places in a landscape island requiring fluffing.

Through various embodiments of the present invention, the user gently positions the lifting member under the existing matted island cover. Typically, this requires just a few simple twist and turns of the straw lifter. Then, with a light lifting and/or twisting action upon the straw lifter, preferably at the handle portion and bracing component, the lifting member supports a portion of the cover adjacent the member, and lifts it up, not unlike increasing the height of one's hair upon brushing or in a carpet pile upon vacuuming a carpet.

It is an object of the present invention to provide a yard and garden tool that can increase the height of matted groundcover in a landscape bed.

It is a further object of the present invention to provide a yard and garden tool that can easily be used by an individual without excess bending of the back.

Further, it is another object of the present invention to provide a pine straw lifter that can be used by an individual with little regard to the individual's strength.

Additionally, it is another object of the present invention to provide an inexpensive tool that can save a homeowner from costly replacement and/or additions to an existing landscape bed.

These and other objects, features and advantages of the present invention will become more apparent upon reading the following specification in conjunction with the accompanying drawing figures.

DETAILED DESCRIPTION OF A PREFERRED EMBODIMENT

Figure 1A:
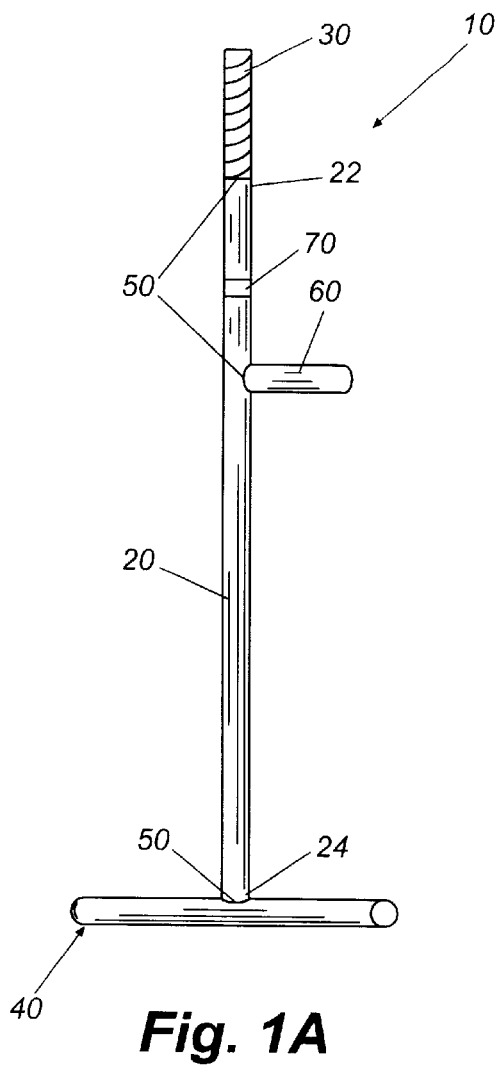
FIG. 1A is a side view of a straw lifter according to one form of the present invention.
Figure 1B:
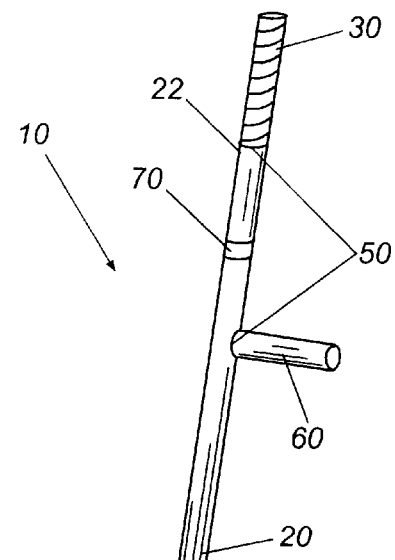
FIG. 1B is a perspective view of the straw lifter of FIG. 1A.

Referring now in detail to the drawing figures, wherein like reference numerals represent like parts throughout the several views, FIGS. 1A and 1B show a preferred embodiment of a straw lifter 10 of the present invention. As shown, straw lifter 10 preferably comprises a main shaft 20 having an upper end 22 and a lower end 24, handle portion 30, lifting member 40, attachment means 50, and bracing component 60.

Straw lifter 10 comprises a main shaft 20 having an upper end 22 and a lower end 24. Shaft 20 preferably comprises a lightweight shaft with uniform cross section. The shaft 20 may comprise of any suitable material having significant durability, capable of withstanding the rigors of outdoor use, and having a lightweight for easy use by an individual, without significant stress or strain to the individual's back because of the lifter's 10 weight. Shaft 20 may comprise a tubular member to give shaft 20 its light weight. When properly used, straw lifter 10 should not ordinarily be subjected to excessive stresses or strains, thus the material of shaft 20 need not have significant strength. Materials such as, but not limited to, aluminums, aluminum alloys, other lightweight metals and alloys, and polymers all are suitable.

Figure 2A:
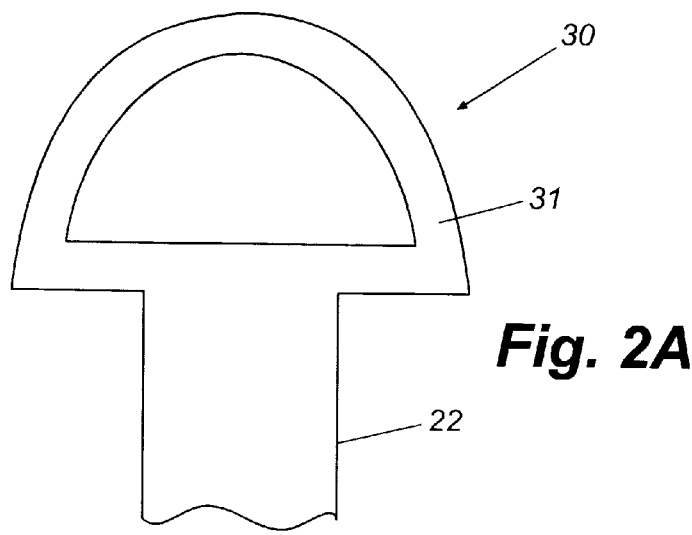
FIG. 2A is a side view of a handle portion of the present invention according to one form of the present invention.
Figure 2B:
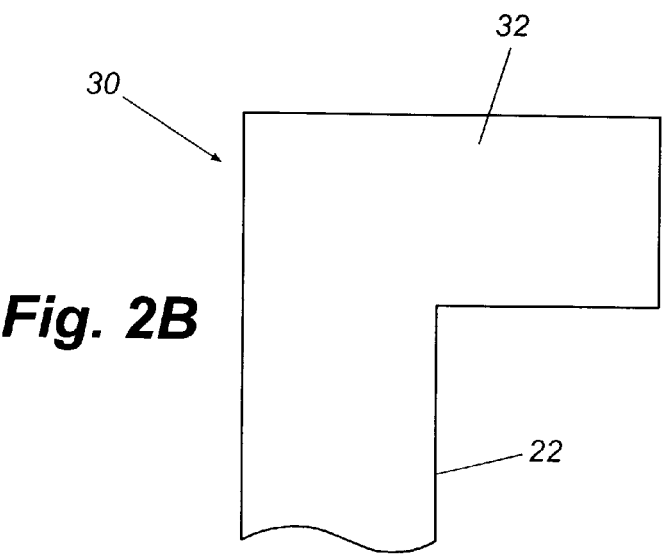
FIG. 2B is a side view of another handle portion according to another embodiment of the present invention.
Figure 2C:
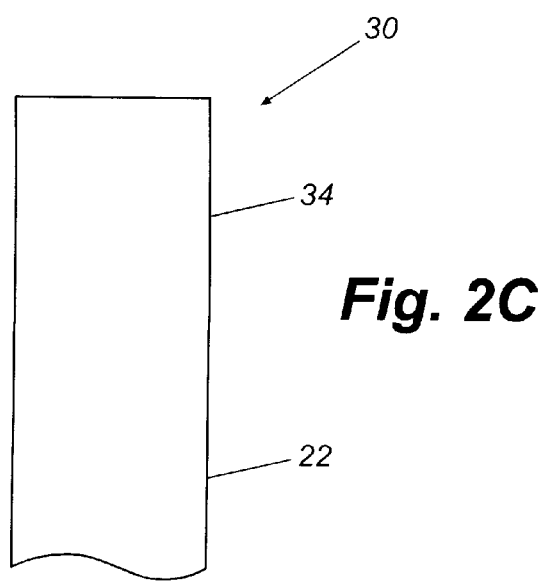
FIG. 2C is a side view of another handle portion according to another embodiment of the present invention.

Shaft 20 further comprises handle portion 30, securedly attached to the upper end 22 of shaft 20 by attachment means 50. As shown in FIGS. 2A–2C, handle portion 30 may comprise several configurations, including a handle 31 design found on shovels and the like, a 90 degree handle 32 extending perpendicular from shaft 20, or gripping surface 34 fixed on upper end 22 of shaft 20. Gripping surface 34 may comprise any suitable surface enabling better gripping of shaft 20 including raised or indented surfaces, rubber and the like, shaped in a number of ways, for a more secure grip of upper end 22 of shaft 20.

Handle portion 30 may be fixedly or releasably attached to the upper end 22 of shaft 20 by any suitable attachment means 50. Attachment means 50 may comprise, among others, adhesives, a weld joint, a clamp, a threaded rod/cooperative threaded bore configuration, or friction. Generally, attachment means 50 allows for the interchangeability of specific elements, such as, for example, handle portion 30 and bracing component 60, of lifter 10, should different handle portions 30 be desired for different groundcover applications.

In one embodiment of the present invention, attachment means 50 attaches each component, other than shaft 20, of straw lifter 10 to shaft 20, including the handle portion 30, lifting member 10 and bracing component 60. In this configuration, straw lifter 10 can be shipped to retailers and/or end users more efficiently, by packaging straw lifter 10 in the most compact fashion.

Pine straw lifter 10 also may incorporate optional bracing component 60. Preferably, bracing component 60 is located in and secured on a suitable position on shaft 20 by attachment means 50. Bracing component 60 extends generally horizontally from shaft 20, wherein the user can place a first hand upon handle portion 30, and a second hand on bracing component 60 when using pine straw lifter 10. In this configuration, a user may more easily bend about the knees, as opposed to the user's back, when operating pine straw lifter 10, and allows for better leverage. Bracing component 60 may have a gripping portion similar to gripping portion 34 to ease in the gripping of bracing component 60. Further, bracing component 60 greatly aids the user to rotate/twist straw lifter 10 to get the lifting member 40 under the straw to be lifted, as described more fully below. Without bracing component 60, a user would grip handle portion 30 and shaft 20 to operate straw lifter 10.

Lifting member 40 is attached to the lower end 24 of shaft 20 by any suitable attachment means 50. Lifting member 40 is designed to slip under a portion of the pine straw intended to be lifted, and remain in contact with the pine straw upon operation of the lifter 10. In a preferred embodiment, as shown in FIG. 1B, lifting member 40 comprises arms 42, 46 and cross component 44. Cross component 44 is that component connecting arms 42, 46, and attached to the lower end 24 of shaft 20 by attachment means 50 generally located at the midpoint of cross component 44. Cross component 44 typically is perpendicular to shaft 20.

Arms 42, 46 typically are perpendicular to component 44 and each in a parallel plane with cross component 44, in opposite directions. Arms 42, 46 may not be perpendicular to cross component 44, and not in planes parallel to crossing member 44, in different embodiments. For example, arms 42, 46 may be of any angle from 0 degrees to 180 degrees in the same horizontal plane as crossing member 44. Preferably, arms 42, 46 are of an angle between 37.5 degrees and 127.5 degrees to cross component 44 in the same horizontal plane. Also, arms 42, 46 may not lie in the same horizontal plane as cross component 44, but may angle upwards or downwards. For example, arms 42, 46 may angle downward toward the ground from cross component 44 to facilitate easing the tool 10 into the groundcover as it is twisted. Preferably, arms 42, 46 are of an angle between 0 degrees and 22.5 degrees relative to the horizontal plane in which cross member 44 lies.

Several embodiments of the present invention exist. For example, handle portion 30, bracing component 60 and lifting member 40 can be securely attached by a number of attachment means 50 so that, for example, handle portion 30 may be removed from upper end 22 of shaft 20 and replaced by another configuration of handle portion 30. In this way, a user may change handle portion 30 to a configuration most appropriate for that user's comfort.

Preferably, bracing component 60 and crossing member 44 are perpendicular to shaft 20, although this configuration may be altered. For example, shaft 20 may incline off perpendicular. Similarly, bracing component 60, and arms 42, 46 may incline. Such departures from perpendicular may make it more comfortable to operate lifter 10 to some users, and make lifter 10 more effective depending on various types of mulch/groundcover. Alternatively, crossing member 44 may be pivotally attached to lower end 24 of shaft 20, allowing crossing member 44 to pivot to a certain degree relative to shaft 20.

An optional adjustment means 70 can be located on shaft 20 between upper end 22 and bracing component 60. Adjustment means 70 allows adjustment in the length of shaft 20, and also allows adjustment in the distance between handle portion 30 and bracing component 60, wherein a user may adjust the relative distance between bracing component 60 and handle portion 30 at a comfortable position so that the user may simultaneously grasp handle portion 30 and bracing component 60 while operating pine straw lifter 10. Adjustment means 70 may be incorporated in shaft 20 so that the overall length of shaft 20 may also be adjusted for the comfort of the user. Adjustment means 70 may include a telescoping configuration, or other known embodiments such as extension units much like leaves added to a dining room table to increase the length of the table, wherein the overall length of shaft 20 may be adjusted vertically.

A preferable way to adjust the length of shaft 20, and a less expensive alternative to adjustment means 70, is to have a unitary shaft 20 of set length with an extended length of handle portion 30 so that a user may "choke up" on handle portion 30 in order to create the most comfortable hand positions.

Figure 3A:
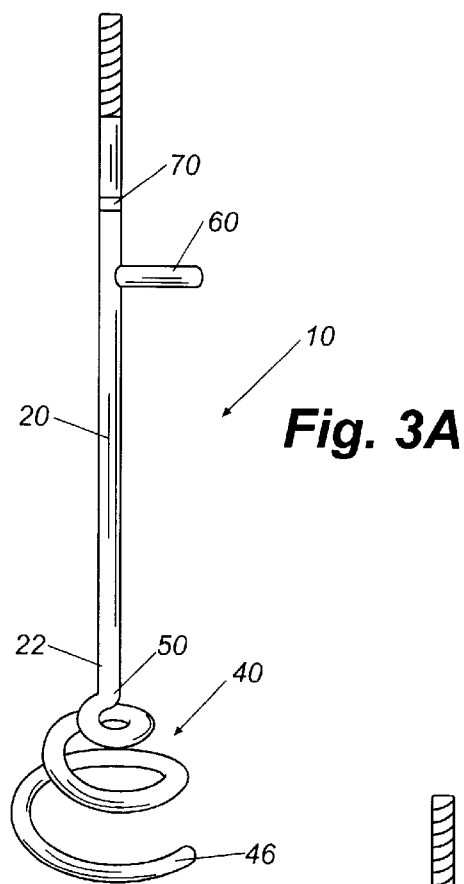
FIG. 3A is a perspective view of a straw lifter according to another embodiment of the present invention.
Figure 3C:
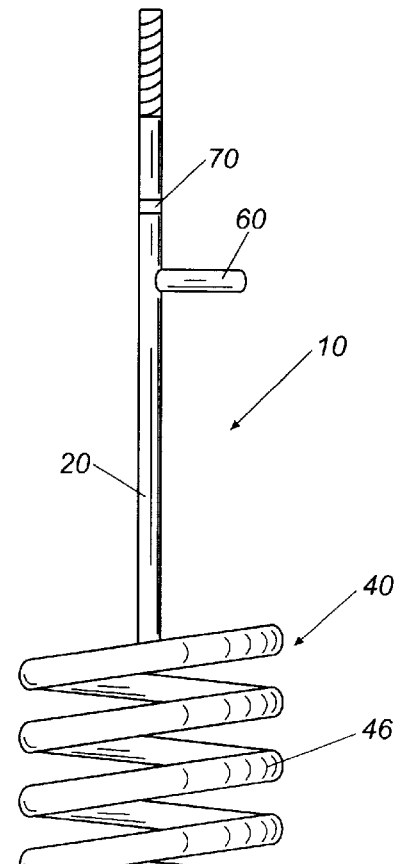
FIG. 3C is another embodiment of the lifting member according to the present invention.
Figure 3B:
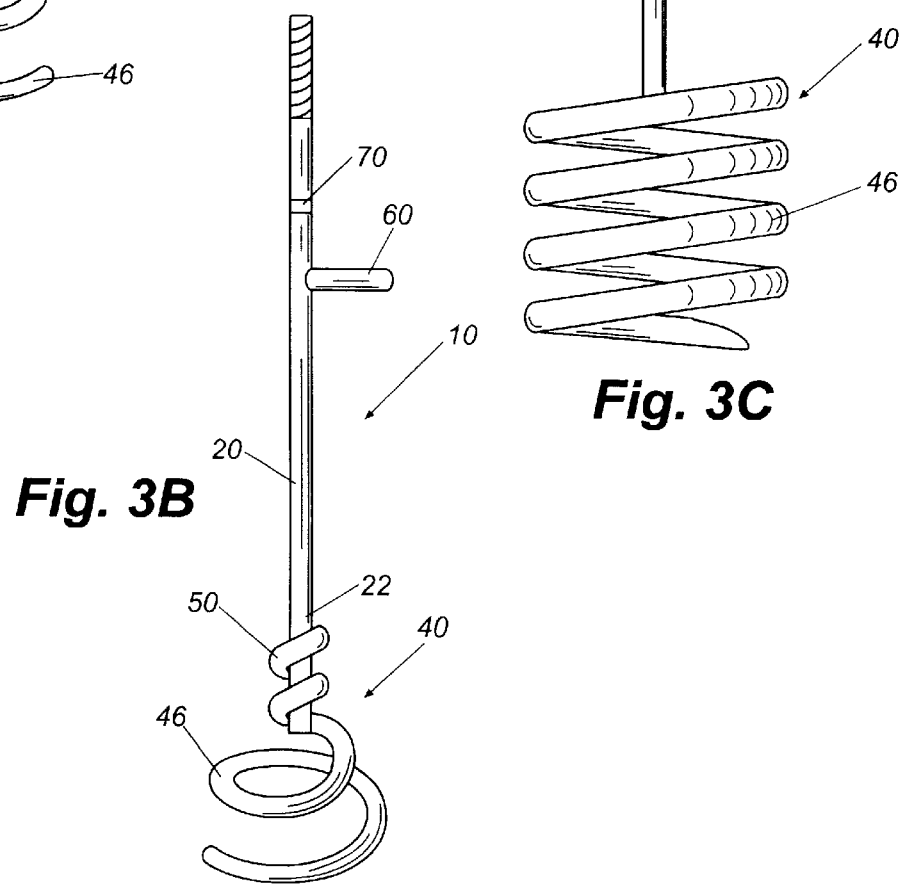
FIG. 3B is an alternate embodiment of the straw lifter of FIG. 3A.

Other embodiments provide a lifting member 40 comprising a spiraling element 46 as shown in FIGS. 3A–3C, wherein through a plurality of encirclements, spiral element 46 may widen as it spirals away from lower end 24 of shaft 20. Alternatively, spiral element 46 may comprise a configuration not unlike a cork screw, wherein the spiral radius remains the same as it extends from lower end 24 of shaft 20. FIGS. 3A and 3B also indicate differences in attachment means 50 of spiral element 46 to lower end 24 of shaft 20. FIG. 3A shows a unitary-type structure where spiral element 46 is attached to and/or extends directly from lower end 24 of shaft 20. FIG. 3B shows a structure where spiral element 46 is a separate element attached to lower end 24 of shaft 20 by encirclement means.

Operation of the Straw Lifter

Figure 4A:
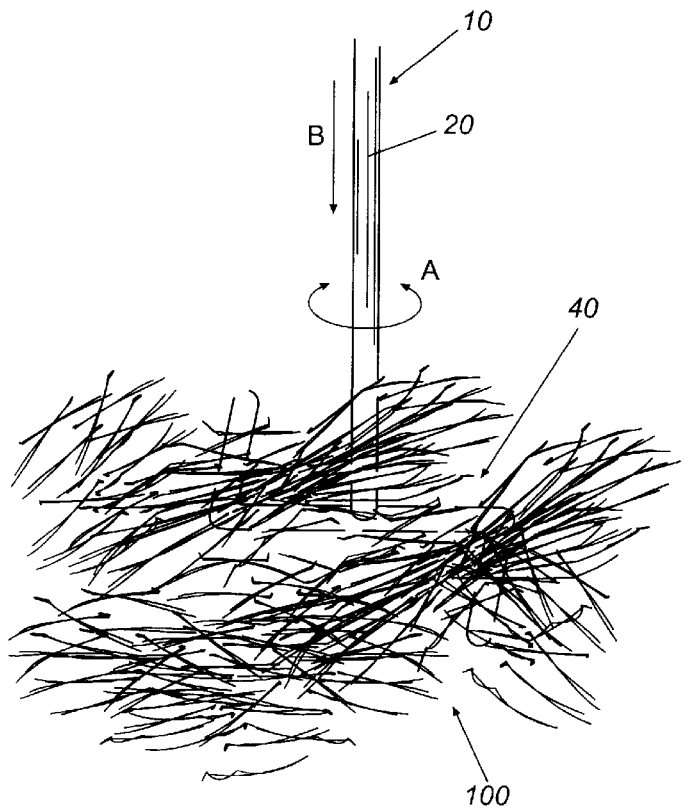
FIG. 4A is a perspective view of the present invention according to FIG. 1 in use prior to lifting the groundcover.
Figure 4B:
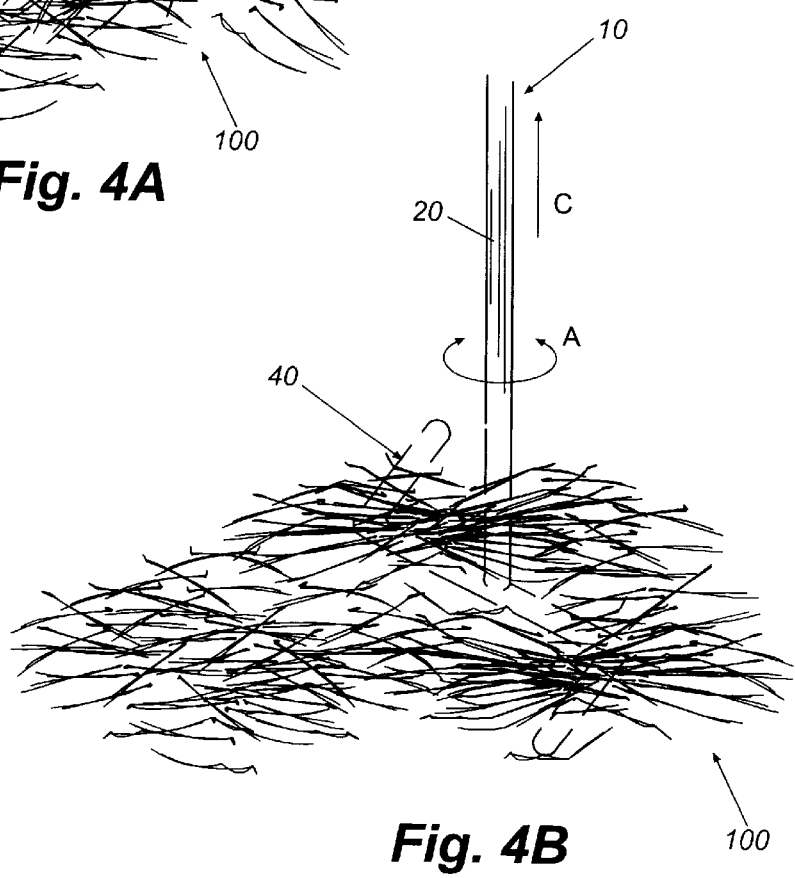
FIG. 4B is a perspective view of the present invention according to FIG. 1 in use after lifting the groundcover.
Figure 5:
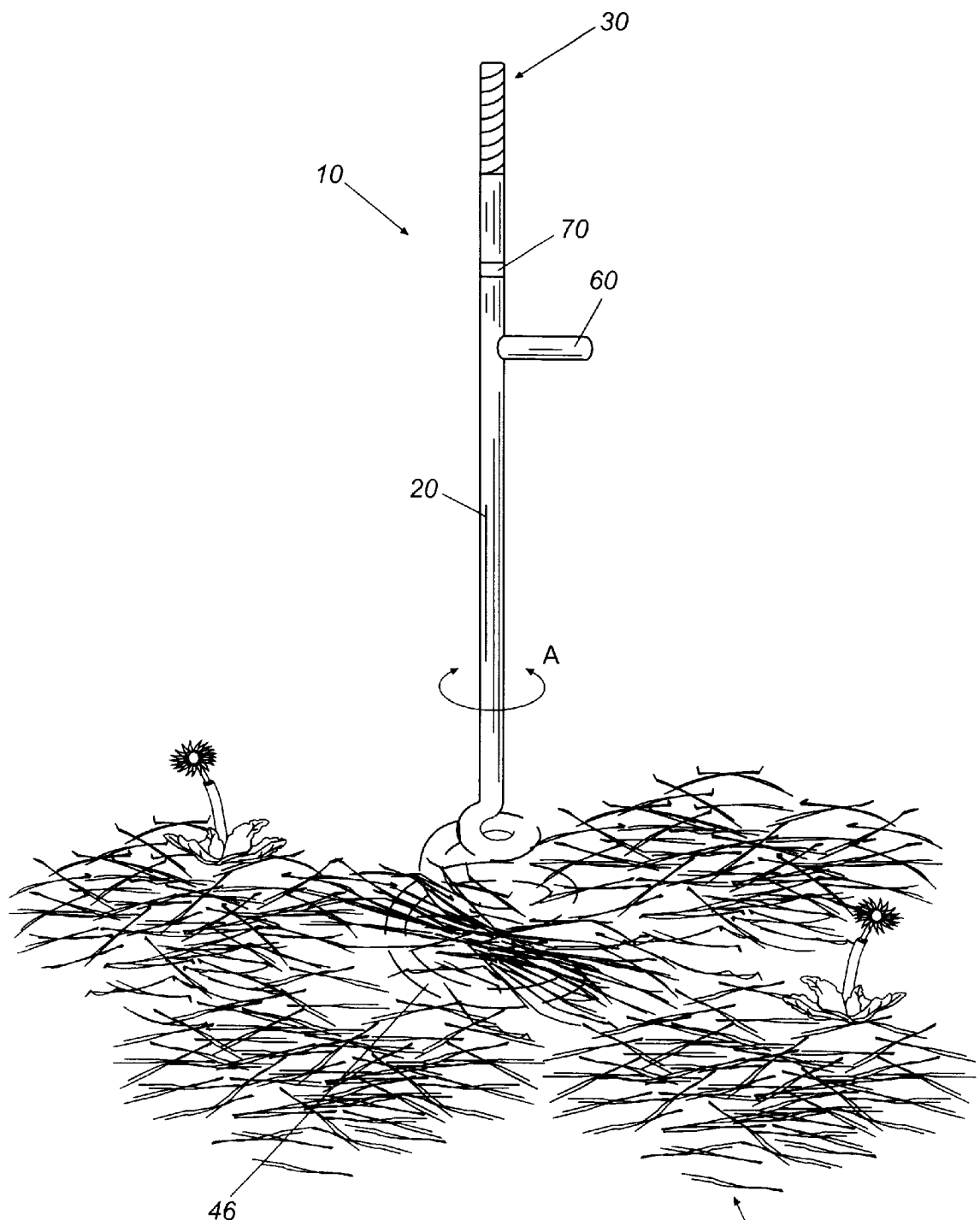
FIG. 5 is a perspective view of the present invention according to FIG. 3 in use.

As shown in FIGS. 4A, 4B, and 5, straw lifter 10 preferably is used to increase the height of matted island cover. As shown in FIG. 4A, straw lifter 10 incorporating lifting member 40 first is positioned above the groundcover, for example, pine straw 100, and is twisted about the longitudinal axis of shaft 20, as depicted by arrow A, and/or moved vertically down into pine straw 100, as depicted by arrow B. Typically, a user will employ both a twisting and downward movement to ultimately bury lifting member 40 below the groundcover 100 sought to be fluffed. The twisting may be forward and backward in a reciprocating manner about the longitudinal axis of shaft 20, or in one direction about the longitudinal axis of shaft 20.

Upon burying lifting member 40, as shown in FIG. 4B, the user then employs either a slight twisting motion A and/or lifting motion C upon straw lifter 10 to gently increase the height of pine straw 100. Lifting member 40 is thus designed to slip under a portion of the pine straw 100 intended to be lifted, and remain in contact with the pine straw 100 upon operation of the lifter 10 as in FIG. 4B.

Similarly, as shown in FIG. 5, straw lifter 10 with lifting member 46 may be "screwed" into pine straw 100 about twisting action A. The screwing action itself will raise the pine straw 100. Alternatively, the lifting member 46 may be screwed into the pine straw 100 a certain distance and then lifted to fluff the pine straw 100. The straw lifter 10 then can be removed from the pine straw 100 by unscrewing. As shown in FIG. 5, bracing component 60 is incorporated with lifter 10 so that the screwing motion may be more comfortably produced by the user with better leverage about bracing component 60 and handle portion 30.

It is known by those of ordinary skill in the art that various alternatives are available. As previously mentioned, the materials of construction of the various elements of the straw lifter can be chosen or altered to achieve the intended result. Further, the dimensions of the straw lifter may be varied for different applications or for different sized persons. Further, the term straw is used for illustrative purposes only, as the tool can be used for most known types of groundcover such as mulch, wood chips, hay, and even chipped stone or gravel.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A yard garden tool for increasing the height of matted and compressed groundcover, the matted groundcover lying atop a ground surface, the yard garden tool comprising:

(a) a main shaft having a length, a longitudinal axis, an upper end and a lower end; and (b) a lifting member attached to said lower end of said main shaft, said lifting member comprising a cross component and at least two arms, said cross component having a central attachment point located at the midpoint of said cross component and at least two ends extending outwardly from said lower end of said main shaft and in a plane generally perpendicular to the longitudinal axis of said main shaft, one of the at least two arms extending generally perpendicular from each of the at least two ends of said cross component and in the same plane as the plane of said cross component, wherein said lifting member is maneuvered above the ground surface and below a portion of the matted groundcover and upon lifting said lifting member by said main shaft, said lifting member raises a portion of the matted groundcover, increasing the height of the groundcover.

2. The yard garden tool of claim 1, wherein said main shaft has a uniform cross-section.

3. The yard garden tool according to claim 1, further comprising a handle portion attached to said upper end of said main shaft.

4. The yard garden tool according to claim 1, further comprising a bracing component attached to said main shaft, wherein said bracing component extends generally perpendicularly from said main shaft.

5. The yard garden tool according to claim 1, further comprising a handle portion attached to said upper end of said main shaft and a bracing component attached to said main shaft, wherein said bracing component extends generally perpendicularly from said main shaft.

6. The yard garden tool according to claim 5, further comprising:

(a) handle portion attachment means to attach said handle portion to said main shaft;

(b) lifting member attachment means to attach said lifting member to said main shaft; and (c) bracing component attachment means to attach said bracing component to said main shaft.

7. The yard garden tool according to claim 1, further comprising a main shaft adjustment means to adjust the length of said main shaft.

8. The yard garden tool according to claim 1, wherein said lifting member comprises a spiraling element having a plurality of encirclements having spiral radii of curvature relative to the longitudinal axis of said main shaft.

9. The yard garden tool according to claim 8, wherein the radii of curvature of each said encirclement increases relative to the longitudinal axis of said main shaft as said spiraling element spirals downward away from said lower end of said main shaft.

10. The yard garden tool according to claim 8, wherein the radii of curvature of each said encirclement is constant relative to the longitudinal axis of said main shaft as said spiraling element spirals downward away from said lower end of said main shaft.

* * * * *